UNITED STATES PATENT OFFICE.

GEORG ZUELZER, OF BERLIN, GERMANY, ASSIGNOR TO CHEMISCHE FABRIK AUF ACTIEN (VORM. E. SCHERING), OF BERLIN, GERMANY.

PANCREAS PREPARATION SUITABLE FOR THE TREATMENT OF DIABETES.

1,027,790.     Specification of Letters Patent.     Patented May 28, 1912.

No Drawing.     Application filed May 6, 1908. Serial No. 431,226. (Specimens.)

*To all whom it may concern:*

Be it known that I, GEORG ZUELZER, doctor of medicine, citizen of the German Empire, residing at Berlin, Kingdom of Prussia, German Empire, have invented a new and useful Improvement in Pancreas Preparations Suitable for the Treatment of Diabetes, of which the following is a specification.

It is known that it is possible by injections of pancreas extract free from albumin to influence suprarenal diabetes produced experimentally. The preparation in question, however, was too septic to be used for persons.

According to this invention a non-poisonous preparation suitable for the treatment of natural diabetes is obtained from the pancreatic gland of an animal, which has been slaughtered when the process of digestion was at its height, thus producing active hyperemia of the organ in question in a natural manner, or still better from a pancreatic gland which has been enriched in active ferment by artificial stasis. The best results are obtained when both conditions are fulfilled. The artificial stasis may be effected by ligaturing the veins leading from the pancreas.

The pancreas preparation may be made as follows: The pancreatic gland of an animal, (cattle, pigs, sheep, dogs, &c.) in narcosis is laid bare, the animal being preferably in a state when the process of digestion is at its height, the principal efferent vein is prepared and ligatured directly in front of its entry into the portal-vein system. In a similar manner the remaining veins of the pancreas are tied and swell greatly after the first ligature. After one to two hours the pancreas is removed for further treatment. This treatment consists in cutting it up into small pieces, leaving the same to self-digestion under weak alkaline reaction for several days, although this self-digestion may be omitted, then precipitating the albuminous bodies, by means of alcohol or by boiling, preferably under the addition of common salt, whereby ferments such as trypsin, steapsin, diastase, &c., are destroyed, and then evaporating the filtrate *in vacuo*. The dry preparation is a fine, gray, feebly smelling powder, which is easily soluble in water or dilute soda solution, is free from ferments and in its best form gives none of the known protein reactions. This dry preparation or residue is the product which is produced according to this invention in its best form but it is obvious that the same product may also be employed in the form of a solution since the product is easily soluble in water or dilute soda solution. The process is carried out in a similar manner if in place of both only one of the above stated conditions is fulfilled, but the preparation so obtained will be less rich in active substance.

Example: The pancreas is chopped fine or minced in a meat-chopping machine and in order to neutralize any organic acid which may be formed, sufficient sodium bicarbonate is added to produce a weak alkaline reaction. About 2 to 5 cubic centimeters of a $\frac{1}{10}$ normal soda solution may be used. The chopped pancreas is then left to self-digestion for several days, then pressed out under high pressure, alcohol added to the liquid so long as albuminous substances are precipitated, and the liquid boiled under the addition of common salt. When the solution is free from albumin it is filtered and evaporated *in vacuo*. If there is any danger of the pancreas spoiling during the digestive process, this can be prevented by adding a solution of common salt, preferably a four per cent. solution. 0.2 to 0.3 gram of the dry substance represent a unit which injected hypodermically neutralizes one milligram of adrenalin. In the treatment of human beings from 4 to 6 units may be injected at a time according to the nature of the case.

No specific reactions with chemical reagents have been observed. As compared with adrenalin the herein described pancreas preparation is not permanent in acid solution. The preparation does not lose its efficiency by boiling and can be applied in the form of a solution, preferably with common salt.

The above described product is particularly suitable for the treatment of diabetes and is administered advantageously by injecting the same into the venous system, preferably diluted by means of a physiological solution of common salt. For illustration, if adrenalin, also known as suprarenin, is injected into an animal a condition is produced during which sugar occurs in the urine. This condition is changed by the injection of the above described product in such manner that the sugar disappears. There appears to be an antagonism between a cause or condition which manifests itself by sugar in the urine and this product, similar to that which exists between toxin and antitoxin.

I claim as my invention:

1. The herein described pancreas preparation having the property of antagonizing a cause or condition which manifests itself by sugar in the urine, said preparation being, when in a dry state, a fine, gray, feebly smelling powder, easily soluble in water or dilute soda solution, free from ferments, and giving none of the known protein reactions, substantially as set forth.

2. The herein described process of manufacturing a pancreas preparation having the property of antagonizing a cause or condition which manifests itself by sugar in the urine, which consists in removing the pancreas from suitable animals, mincing the same, extracting the liquid from the minced pancreas, precipitating the albuminous substances from said liquid and evaporating the filtrate, substantially as set forth.

3. The herein described process of manufacturing a pancreas preparation having the property of antagonizing a cause or condition which manifests itself by sugar in the urine, which consists in removing the pancreas from suitable animals, leaving the pancreas to self-digestion, extracting the liquid, precipitating the albuminous substances contained therein and evaporating the filtrate, substantially as set forth.

4. The herein described process of manufacturing a pancreas preparation having the property of antagonizing a cause or condition which manifests itself by sugar in the urine, which consists in enriching the pancreas in the animal by artificial stasis, then removing the pancreas from the animal, leaving the pancreas to self-digestion, extracting the liquid, precipitating the albuminous substances contained therein and evaporating the filtrate, substantially as set forth.

In testimony whereof I have hereunto set my hand in the presence of two subscribing witnesses.

GEORG ZUELZER.

Witnesses:
HENRY HASPER,
EMIL GRUNWALD.